(12) United States Patent
Yang

(10) Patent No.: US 7,034,890 B2
(45) Date of Patent: Apr. 25, 2006

(54) METHOD AND APPARATUS FOR UPDATING A COMPUTER SYSTEM CLOCK FROM A REAL TIME TELEVISION SIGNAL

(75) Inventor: Ivan Wong Yin Yang, Markham (CA)

(73) Assignee: ATI Technologies, Inc., Ontario (CA)

( * ) Notice: Subject to any disclaimer, the term of this patent is extended or adjusted under 35 U.S.C. 154(b) by 986 days.

(21) Appl. No.: 09/835,018

(22) Filed: Apr. 13, 2001

(65) Prior Publication Data

US 2002/0149697 A1    Oct. 17, 2002

(51) Int. Cl.
H04N 7/08    (2006.01)
H04N 7/087    (2006.01)

(52) U.S. Cl. ............... 348/460; 348/461; 348/473; 348/553

(58) Field of Classification Search ......... 348/510, 348/460, 553, 461, 473, 725, 464, 467, 468, 348/476, 478; 368/21, 10, 1, 9; 386/85, 386/84
See application file for complete search history.

(56) References Cited

U.S. PATENT DOCUMENTS

| | | | | |
|---|---|---|---|---|
| 5,329,500 A | * | 7/1994 | Baik et al. | 368/10 |
| 5,473,385 A | * | 12/1995 | Leske | 375/240.26 |
| 5,557,585 A | * | 9/1996 | Hanai et al. | 368/43 |
| 5,561,461 A | * | 10/1996 | Landis et al. | 348/725 |
| 5,617,146 A | * | 4/1997 | Duffield et al. | 348/460 |
| 6,137,539 A | * | 10/2000 | Lownes et al. | 348/569 |
| 6,169,580 B1 | * | 1/2001 | Shin et al. | 348/460 |
| 6,215,862 B1 | * | 4/2001 | Lopes | 379/110.01 |
| 6,433,831 B1 | * | 8/2002 | Dinwiddie et al. | 348/553 |
| 6,452,644 B1 | * | 9/2002 | Shimakawa et al. | 348/730 |
| 6,529,526 B1 | * | 3/2003 | Schneidewend | 370/486 |
| 6,549,905 B1 | * | 4/2003 | Kim et al. | 707/10 |

* cited by examiner

Primary Examiner—John Miller
Assistant Examiner—Jean W. Désir
(74) Attorney, Agent, or Firm—Vedder, Price, Kaufman & Kammholz, P.C.

(57) ABSTRACT

The system for updating a clock in an electronic device, such as a personal computer, has a receiver system having an input for receiving a real time signal and having an output on which is provided digital information representative of the real time signal. An extraction module is operatively coupled to the receiver system, the extraction module extracting at least a current time value from the display data. An update module is operatively coupled to the extraction module, the update module updating the clock in the computer when the current time value of the digital information differs from a current value of the clock in the computer. In one embodiment a validating unit is operatively coupled between the extraction module and the update module. The validating unit compares channel identification data derived from the display data to time zone data in the computer, the time zone data being indicative of a time zone in which the computer is currently located.

22 Claims, 5 Drawing Sheets

METHOD AND APPARATUS FOR UPDATING A COMPUTER SYSTEM CLOCK FROM A REAL TIME TELEVISION SIGNAL

FIELD OF THE INVENTION

The present invention relates generally to updating system clocks in electronic equipment and computers, such as personal computers. More specifically, the present invention updates the system clock of the personal computer using a real time television signal.

BACKGROUND OF THE INVENTION

Computers, such as personal computers, have system clocks that are necessary for proper operation of the computers. From time to time the computer system clock will become out of sync (lose or gain time) due to power failures or frequency drifts, for example. In the prior art it is necessary for the user to become aware that the system clock of the computer is no longer displaying the correct time. Once this has been determined, the user must manually update or reset the computer's clock. This is a drawback in the prior art because, for example, many documents may be created before the user realizes the system clock is not set to the correct time.

Today many computers have television tuners, such as in tuner cards manufactured by ATI Technologies, Inc. The television tuner allows the personal computer to receive real time television signals. As is well known in the art the television signals have even and odd fields that are interlaced in a television receiver to produce an image. A field contains a plurality of lines of information. In one known format lines 1–21 of a field are referred to as the vertical blanking interval, and the remaining lines contain data with regards to an image to be displayed by the television receiver. In the odd field line 21 contains closed caption data, and in line 21 of the even field is stored extended data services information (EDS or XDS). This information includes, for example, parental control information, programming information, channel identification information (station identifier), and time stamp information (current time). For the DTV, HDTV (digital television), the time stamp information is also available in the PSIP (Program and system Information Protocol) digital payload. This information is used by a variety of electronic equipment, such as, televisions, and video recorders, for example. Some of the commercial video recorders will reset the clock from the EDS information, in case of a power failure, but such recorders typically do not have built-in intelligence to verify that the time stamp information is correct for the given geographic region, e.g., it may pick the time stamp from a station that is broadcast from another time zone. However, although such television signals are used to display images on a personal computer display device, it is a drawback of the prior art that the system clocks of personal computers must be manually updated by a user.

Therefore, there is a need in the prior art for a method and apparatus that provide automatic update of the system clock in a personal computer to a correct time. There is a further need in the prior art to ensure that system clock is updated only when the received time stamp information is valid for the time zone in which the computer is physically located.

DESCRIPTION OF THE PREFERRED EMBODIMENTS

In general terms, the present invention is a system for updating a clock in an electronic device, such as a personal computer. The personal computer has a receiver system having an input for receiving a real time signal (which can be an analog or Digital television signal) and having an output on which is provided display data representative of the real time signal. An extraction module is operatively coupled to the receiver system and the extraction module extracts at least a current time value from the EDS (analog broadcast), PSIP(digital broadcast) or just the display data on the screen. An update module is operatively coupled to the extraction module, the update module updates the clock in the computer when the current time value of the display data differs from a current value of the clock in the computer. In one embodiment a validating unit is operatively coupled between the extraction module and the update module. The validating unit compares channel identification data derived from the display data to time zone data in the computer, the time zone data being indicative of a time zone in which the computer is currently located. In this embodiment the clock is updated only when the comparison indicates that a station identified by the channel identification data is in the same time zone as the electronic equipment.

It is to be understood that the present invention is usable in numerous types of electronic equipment, and that a personal computer is only one example of an application of the present invention. In the particular embodiment of the present invention in a personal computer that has a television tuner card, the real time signal is a television signal, and the channel identification data and the current time value are contained in a vertical blanking interval (VBI) of the television signal. The extraction module extracts digital information (extended data services), the channel identification data and the current time value, from the vertical blanking interval of the television signal. Similarly, for DTV, the extraction module will extract the information from PSIP. The clock is then updated when the current time value of the display data is not equal to or differs by a predetermined amount from a current value of the clock in the computer.

Figure 1:
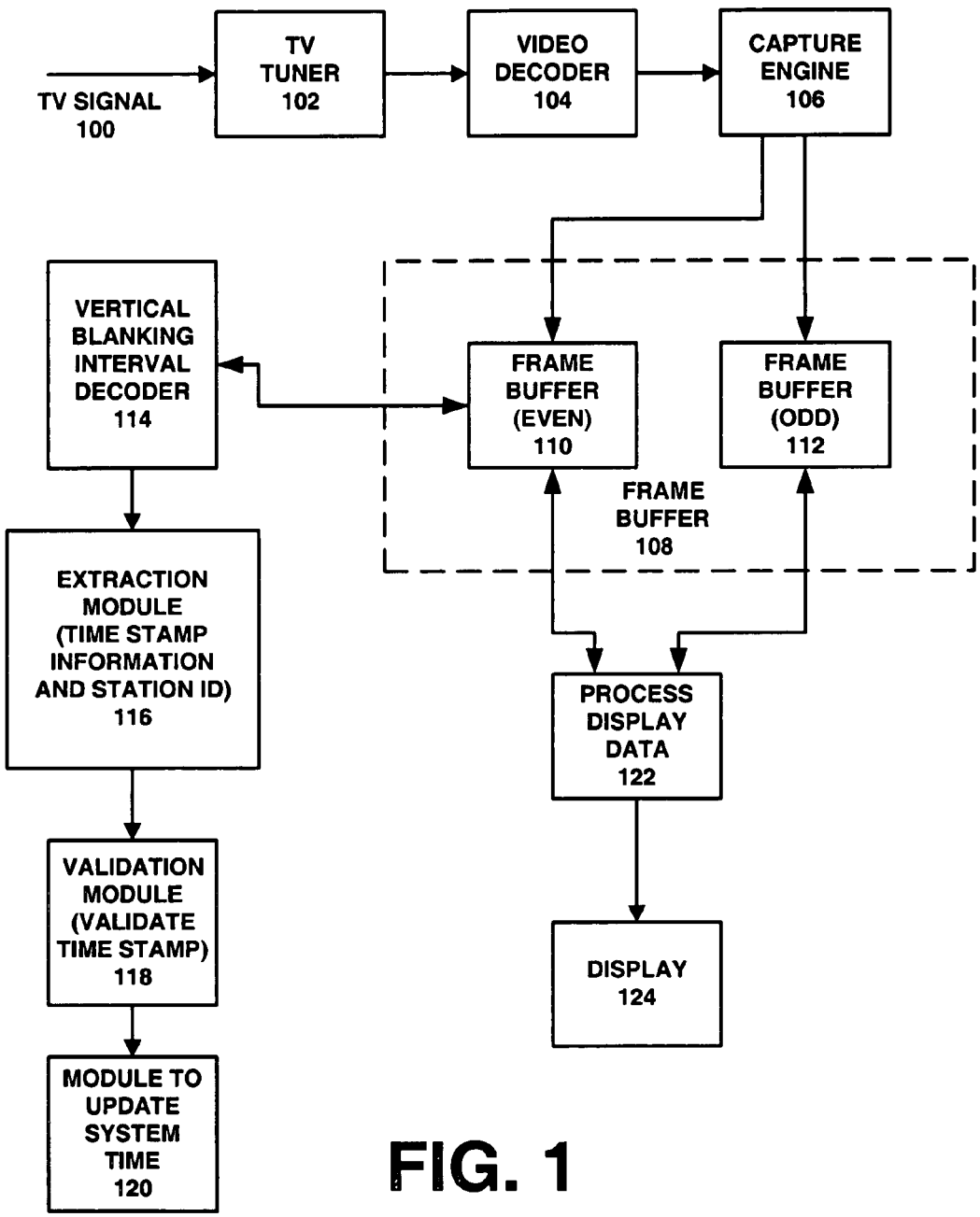
FIG. 1 is a block diagram of an embodiment of the present invention.

In FIG. 1 a system is depicted for updating an interval clock in a computer. A tuner 102, such as a TV tuner, has an input that receives a real time analog (or digital) television signal 100. A video decoder 104 is operatively coupled to the tuner 102, the video decoder converting the analog television signal 100 to a digital television signal. Where the input television signal is digital, the decoder 104 may be eliminated. A capture engine 106 is operatively coupled to the video decoder 104, the capture engine 106 converts the digital television signal to display data, as known in the art, in a frame buffer 108. The frame buffer 108 has a frame buffer 110 for the even field of the television signal, and a frame buffer 112 for the odd field of the television signal. A decoder, such as a vertical blanking interval decoder (or PSIP decoder for digital TV) 114 is operatively coupled to the frame buffer 108. The vertical blanking interval decoder 114 (or PSIP decoder) derives information (i.e., digital information) data from the EDS or PSIP data that is indicative of information stored in a vertical blanking interval of the television signal or PSIP data payload, respectively. An extraction module 116 is operatively coupled to the vertical blanking interval decoder 114 (PSIP decoder), the extraction module 116 extracts at least time stamp information and channel identification information from the information data. A validating unit 118 is operatively coupled to the extraction module 116, the validating unit 118 compares channel identification data derived from the information data to time zone data in the computer. The time zone data is indicative of a time zone in which the computer is currently located. An update module 120 is operatively coupled to the extraction module and validation module 118, the update module 120 updates the clock in the computer when a current value of the current time value of the display data differs from a current value of the clock in the computer and when the comparison indicates that a station identified by the channel identification data is in the same time zone as the computer. The clock can be updated based on numerous different criterions. For example, the clock can be updated when the current time value of the display data differs by a predetermined amount from a current value of the clock in the computer. Alternatively, the clock can be updated when its value is not equal to the current time value of the display data, that is the current time as contained in the real time television signal.

The vertical blanking internal decoder 114, the extraction module 116, the validation module 118 and the module to update system time 120 are preferably software modules as part of a videographics accelerator driver that is executed on a processing device such as a host CPU, DSP, or other suitable device. However, it will be recognized that any suitable combination of hardware, software and firmware may be used.

Figure 2:
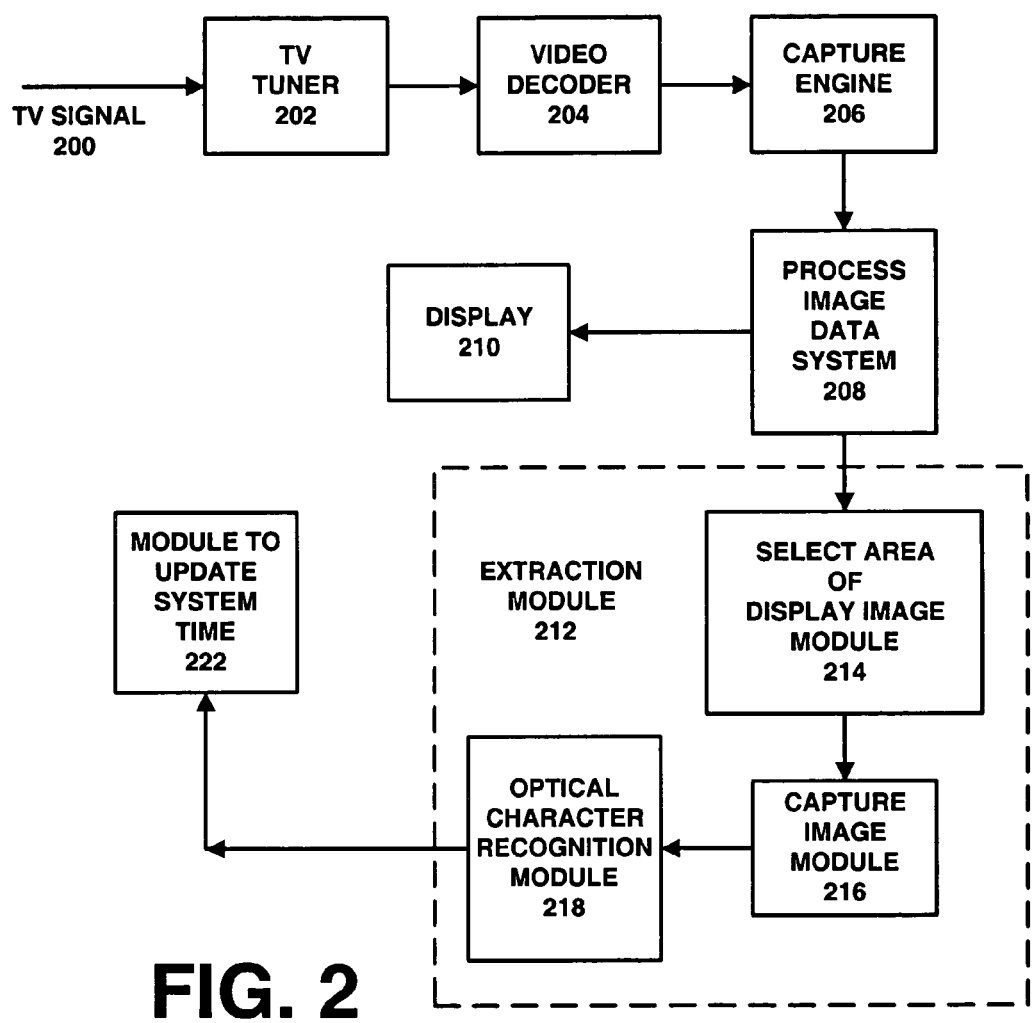
FIG. 2 is a block diagram of an alternative embodiment of the present invention.

An alternative embodiment of the present invention that employs optical character recognition to obtain at least the current time as opposed to obtaining the information from the vertical blanking information is depicted in FIG. 2. In this embodiment a system for updating an interval clock in a computer has a tuner 202 having an input that receives a real time analog television signal 200. A video decoder 204 is operatively coupled to the tuner 202 and converts the analog television signal 200 to a digital television signal that is converted by a capture engine 206 to display data. The other components of the computer are grouped generally as process image data system 208, which processes the display data from the capture engine 206 and displays corresponding images on a display 210. An extraction module 212 is operatively coupled to the process image data system 208, the extraction module 212 having optical character recognition capability for extracting at least current time information from the display data. In particular, the extraction module 212 has module 214 for selecting an area of the display image. For example, this may be a timebox that is displayed on the display 210. The timebox contains the current time and is derived from the time stamp information contained in the real time television signal. A capture engine 216 converts the time displayed in the timebox to a format, which is readable by a optical character recognition module 218.

An update module 222 is operatively coupled to the extraction module 212, and the update module 222 updates the clock in the computer when a current value of the current time value of the display data differs from a current value of the clock in the computer. No validation module is needed in this case because the user has made a conscious decision to select the time stamp from the screen. In this embodiment, the selected time stamp from the screen is selected by the input data selection module 214 which is then captured by the capture image module 216 and interpreted by the OCR module 218. The selected time stamp is compared by the update module 222 with the current time value of the electronic device being considered. As described above, the clock is updated when the current time value of the display data (selected time stamp) is not equal to or differs by a predetermined amount from a current value of the clock in the electronic equipment.

Figure 3:
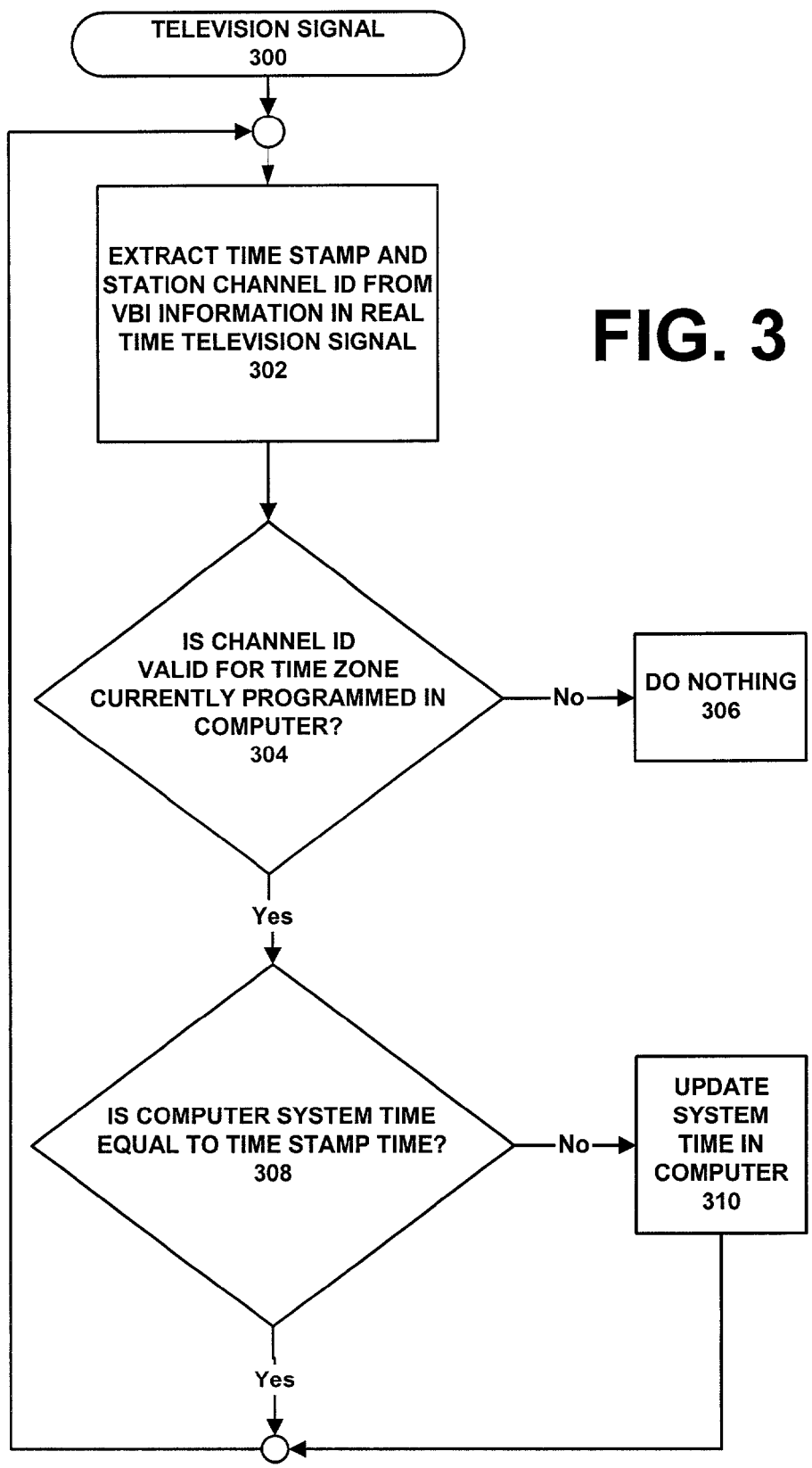
FIG. 3 is a flowchart of the method of the present invention corresponding to FIG. 1.

FIG. 3 depicts the method of the present invention for updating a clock in an electronic device, such as a personal computer. In an initial step 300 a real time television signal is received by a TV tuner or digital receiver. Under control of the driver, in a next step 302, the time stamp information and the station channel ID information are extracted from the vertical blanking interval of the real time television signal. In step 304 it is determined if the channel ID is valid for the time zone in which the computer is currently located. If it is not, then in step 306 nothing is done, that is, the clock in the computer is not updated. When the channel ID is valid, then a determination is made in step 308 as to whether or not the time value of the clock in the personal computer is equal to the time value of the time stamp information. If it is not equal, then the clock in the computer is updated with the current time of the time stamp information in step 310. If it is equal, then the clock does not need to be updated and the method cycles back to step 302. This method continually checks and updates the clock of the computer, while the computer is operating.

Figure 4:
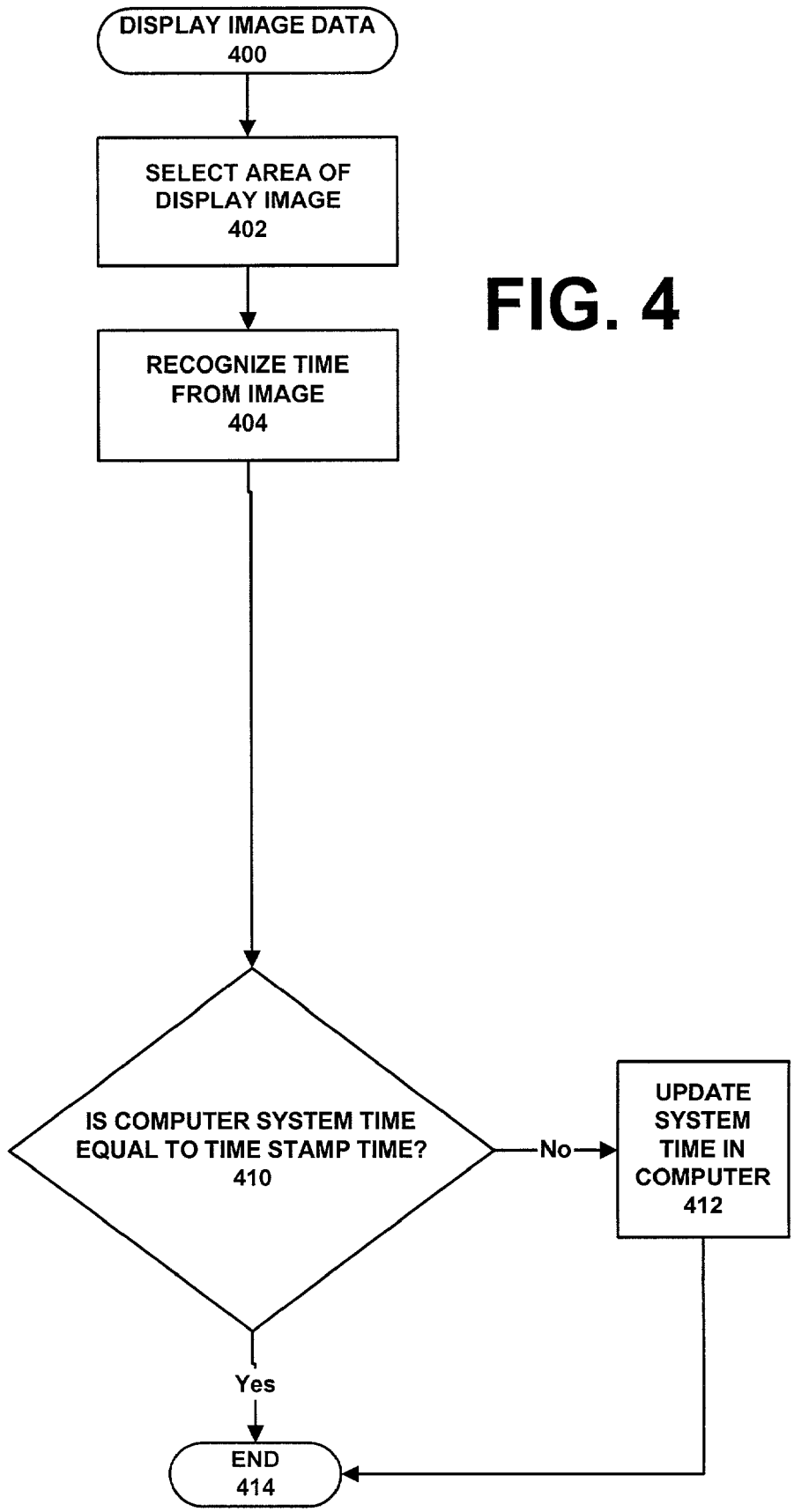
FIG. 4 is a flowchart of the method of the present invention corresponding to FIG. 2.

The flowchart depicted in FIG. 4 is an alternative embodiment of the present invention. Display data is formed according to the FIG. 2 embodiment. The display data is then available in step 400. An area of the display data is selected in step 402, this area containing the current time image and this current time image being derived from the real time television signal. In step 404, at least current time information is extracted from the display data using optical character recognition. Optical character recognition is well known in the art.

In step 410 a determination is made as to whether or not the time value of the clock in the personal computer is equal to the time value of the displayed time image. If it is not equal, then the clock in the computer is updated with the current time of the displayed time image in step 412. If it is equal, then the clock does not need to be updated and both steps 410 and 412 lead to end step 414. It is to be understood that the method can cycle back to step 402.

Figure 5:
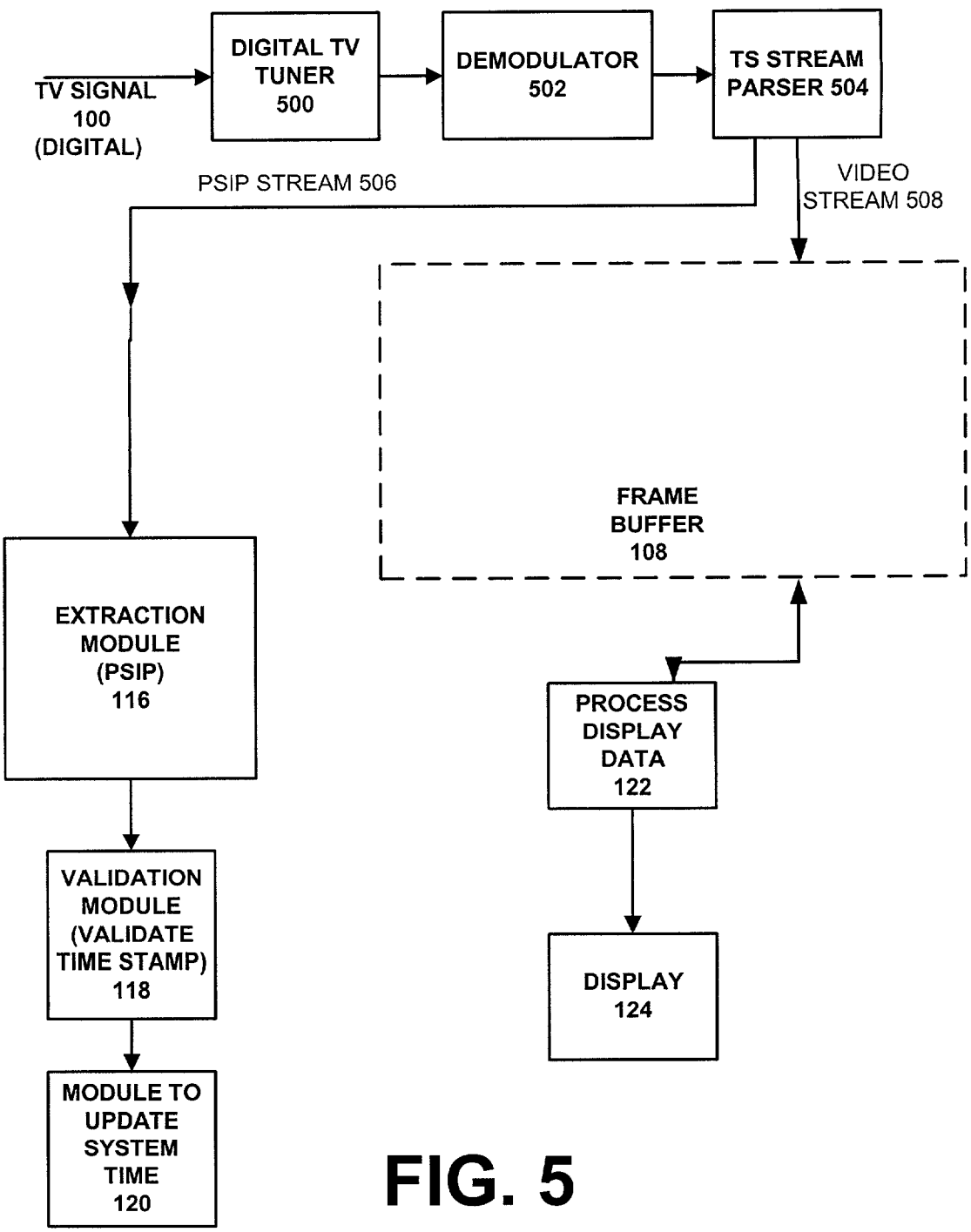
FIG. 5 is a block diagram of an example of another embodiment of the invention.

FIG. 5 illustrates an embodiment that receives a digital TV signal and uses PSIP to obtain the current time data. The channel identification data and the current time value are contained in a data payload of the digital transport stream, namely in the PSIP. As shown, a digital TV tuner 500 receives the signal 100. A demodulator 502 demodulates the digital TV signal obtained by the digital TV tuner 500 as known in the art and produces a transport stream for a transport stream parser 504. The transport stream parser 504 parses the transport stream to produce a PSIP stream 506 and a video stream 508. The extraction module 116 extracts the PSIP data to obtain the current time value. The validation module 118 and the update module 120 operate as described above.

Like the analog television system, the digital system further includes the validating unit that is operatively coupled between the extraction module and the update module. The validating unit compares channel identification data derived from the digital information to time zone data in the computer, the time zone data being indicative of a time zone in which the computer is currently located. The clock is updated only when the comparison indicates that a station identified by the channel identification data is in the same time zone as the computer. Alternatively, the clock is updated when the current time value of the digital information differs by a predetermined amount from a current value of the clock in the computer.

Therefore, the present invention fulfills the need in the prior art for a method and apparatus that continually and automatically updates the internal clock of electronic equipment, such as a personal computer. In particular, the present invention uses a real time television signal to update and reset the computer clock.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A system for updating a clock in an electronic device, comprising:
   a receiver system having an input for receiving a real time signal and having an output from which is provided digital information representative of the real time signal;
   an extraction module operatively coupled to the receiver system, the extraction module extracting at least a current time value from the digital information;
   an update module operatively coupled to the extraction module, the update module updating the clock in the electronic equipment when the current time value of the digital information differs from a current value of the clock in the electronic equipment;
   wherein the system further comprises a validating until that is operatively coupled between the extraction module and the update module, the validating unit comparing channel identification data derived from the digital information to time zone data in the electronic equipment, the time zone data being indicative of a time zone in which the electronic equipment is currently located; and
   wherein the clock is updated only when the comparison indicates that a station identified by the channel identification data is in the same time zone as the electronic equipment.

2. The system according to claim 1, wherein the real time signal is a television signal, and wherein the channel identification data and the current time value are contained in a vertical blanking interval of the television signal.

3. The system according to claim 1 wherein the real time signal is a digital television signal, and wherein the channel identification data and the current time value are contained in a data payload of the digital transport stream.

4. The system according to claim 2, wherein the extraction module extracts the channel identification data and the current time value from the vertical blanking interval of the television signal.

5. A system for updating an interval clock in a computer, comprising:
   a tuner having an input that receives a real time analog television signal;
   a video decoder operatively coupled to the tuner, the video decoder converting the analog television signal to a digital television signal;
   a capture engine operatively coupled in the video decoder, the capture engine converting the digital television signal to display data;
   a vertical blanking interval decoder configured to obtain the display data, the vertical blanking interval decoder deriving information data from the display data, the information data is indicative of information stored in a vertical blanking interval of the television signal;
   an extraction module operatively coupled to the vertical blanking interval decoder, to extraction module extracting at least time stamp information and channel identification information from the information data;
   a validating unit that is operatively coupled to the extraction module, the validating unit comparing channel identification data derived from the information data to time zone data in the computer, the time zone data being indicative of a time zone in which the computer is currently located; and
   an update module operatively coupled to the extraction module and the validation module, the update module updating the interval clock in the computer when a current value of the time stamp information of the display data differs from a current value of the interval clock in the computer and when the comparison indicates that a station identified by the channel identification information is in the same time zone as the computer.

6. The system according to claim 5, wherein the channel identification information and the current value of the time stamp information are contained in the vertical blanking interval of the television signal.

7. The system according to claim 5, wherein the interval clock is updated when the current value of the time stamp information differs by a predetermined amount from a current value of the interval clock in the computer.

8. A system for updating an interval clock in a computer, comprising:
   a tuner having an input that receives a real time analog television signal;
   a video decoder operatively coupled to the tuner, the video decoder converting the analog television signal to a digital television signal;
   a capture engine operatively coupled to the video decoder, the capture engine converting the digital television signal to display data in a frame buffer;
   an extraction module operatively coupled to the frame buffer, the extraction module having optical character recognition capability for extracting at least current time information from the display data; and
   an update module operatively coupled to the extraction module, the update module updating the clock in the computer when a current value of the current time value of the display data differs from a current value of the clock in the computer.

9. The system according to claim 8, wherein the system further comprises a module for selecting an area on a display containing a time box.

10. The system according to claim 8, wherein the clock is updated only when the comparison indicates that a station identified by the channel identification data is in the same time zone as the computer.

11. The system according to claim 8, wherein the clock is updated when the current time value of the display data differs by a predetermined amount from a current value of the clock in the computer.

12. A method for updating a clock in an electronic device, comprising:
receiving a real time signal and providing therefrom digital information representative of the real time signal;
extracting at least a current time value from the digital information;
updating the clock in the electronic equipment when a current value of the current time value of the digital information differs from a current value of the clock in the electronic equipment;
wherein the method further comprises comparing channel identification data derived from the digital information to time zone data in the electronic equipment, the time zone data being indicative of a time zone in which the electronic equipment is currently located; and
wherein the clock is updated only when the comparison indicates that a station identified by the channel identification data is in the same time zone as the electronic equipment.

13. The method according to claim 12, wherein real time signal is a television signal, and wherein the channel identification data and the current time value are contained in a vertical blanking interval of the television signal.

14. The method according to claim 13, wherein the method further comprises the step of extracting the channel identification data and the current time value from the vertical blanking interval of the television signal.

15. A method for updating an interval clock in a computer, the computer having a tuner having an input that receives a real time analog television signal, a video decoder operatively coupled to the tuner, the video decoder converting the analog television signal to a digital television signal, comprising:
converting the digital television signal to display data and storing the display data in a frame buffer;
deriving information data from the display data stored in the frame buffer, the information data is indicative of information stored in a vertical blanking interval of the television signal;
extracting at least time stamp information and channel identification information front the information data;
comparing the channel identification information derived from the information data to time zone date in the computer, the time zone data being indicative of a time zone in which the computer is currently located; and
updating the interval clock in the computer when a current value of the time stamp information of the information data differs from a current value of the interval clock in the computer and when the comparison indicates that a station identified by the channel identification information is in the same time zone as the computer.

16. The method according to claim 15, wherein the channel identification information and the current value of the time stamp information are contained in the vertical blanking interval of the television signal.

17. The method according to claim 15, wherein the interval clock is updated when the current value of the time stamp information differs by a predetermined amount from a current value of the interval clock in the computer.

18. A method for updating an interval clock is a computer, the computer having a tuner having an input that receives a real time analog television signal, a video decoder operatively coupled to the tuner, the video decoder converting the analog television signal to a digital television signal, and a capture engine operatively coupled to the video decoder, the capture engine converting the digital television signal to display data, comprising the steps of:
extracting at least current time information from the display data using optical character recognition; and
updating the clock in the computer when a current value of the current time value of the display data differs from a current value of the clock in the computer.

19. The method according to claim 18, wherein the method further comprises the step of comparing channel identification data derived from the display data to time zone data in the computer, the time zone data being indicative of a time zone in which the computer is currently located.

20. The method according to claim 18, wherein the clock is updated only when the comparison indicates that a station identified by the channel identification data is in the same time zone as the computer.

21. A system for updating an interval clock in a computer, comprising:
a tuner having an input that receives a digital television signal having a transport stream;
a digital television demodulator to decode the transport stream;
a transport stream parser to separate PSIP data from the transport stream;
an extraction module operative to derive information data from the PSIP data;
an update module operatively coupled to the extraction module, the update module updating the interval clock in the computer when a current time value of the information data differs from a current value of the interval clock in the computer,
a validating unit that is operatively coupled between the extraction module and the update module, the validating unit comparing channel identification data derived from the information data to time zone data in the computer, the time zone data being indicative of a time zone in which the computer is currently located; and
wherein the interval clock is updated only when the comparison indicates that a station identified by the channel identification data is in the same time zone as the computer.

22. The system according to claim 21, wherein the interval clock is updated when the current time value of the information data differs by a predetermined amount from a current value of the interval clock in the computer.

* * * * *